INVENTOR
BEAUMONT J. DAVIES

BY
Watson, Cole, Grindle + Watson
ATTORNEYS

May 16, 1967  B. J. DAVIES  3,320,501
MOTOR CONTROL SYSTEM HAVING A COUNTER RESPONSIVE
TO A MODULATED PULSE TRAIN
Filed Aug. 4, 1960  4 Sheets-Sheet 3

INVENTOR
BEAUMONT J. DAVIES

BY
Watson, Cole, Grindle, Watson

ATTORNEYS

United States Patent Office 3,320,501
Patented May 16, 1967

3,320,501
MOTOR CONTROL SYSTEM HAVING A COUNTER RESPONSIVE TO A MODULATED PULSE TRAIN
Beaumont J. Davies, Putnoe, Bedford, England, assignor to George Richards & Company Limited, Altrincham, England, a company of Great Britain
Filed Aug. 4, 1960, Ser. No. 47,544
Claims priority, application Great Britain, Aug. 7, 1959, 27,147/59
9 Claims. (Cl. 318—18)

This invention relates to arrangements for phase modulating a carrier waveform in accordance with information supplied in the form of command pulses or like signals. For example the arrangement may be applied to a servo system in which a command signal carries its command as the phase of a regular wave and in which a command to be initiated, or a feed back signal, appears in pulse form with no definite phase relationship with the carrier waveform.

According to the present invention the arrangement includes apparatus arranged to generate the carrier waveform comprising a source of regularly-spaced pulses and a counter of the pulses giving an output in the form of the carrier waveform with a normal cycle period equal to the time to count a certain number of pulses, and a mixer arranged to combine the command pulses with the regularly-spaced pulses and arranged, in response to a command pulse, to add a pulse to, or subtract a pulse from, the regularly-spaced pulse.

It is clear that with such an arrangement, if a pulse is added to the regularly-spaced pulses in response to a command pulse, the phase of the carrier waveform will be advanced because it will count $n$ pulses (where $n$ is the certain number) in less time than the time in which $n$ of the regularly-spaced pulses occur. Conversely by subtracting a pulse from the regularly-spaced pulses in response to a command pulse the phase of the carrier waveform can be retarded.

Conveniently a synchronizing circuit is arranged to delay command pulses to be in predetermined time relationship with the regularly-spaced pulses before being supplied to the mixer. This simplifies the adding of a pulse to, or the subtraction from, the regularly-spaced pulses.

For example, for advancing the phase of the carrier wave-form the synchronizing circuit may be arranged to delay the command pulses to occur at times between regularly-spaced pulses and then the delayed command pulses and the regularly-spaced pulses can be combined by being passed through an OR gate. The command pulses could be synchronized with pulses from a second series of regularly-spaced pulses of which the pulses occur between those from the first series.

When it is desired to retard the phase of the carrier waveform, the command pulses may be delayed to occur in synchronism with pulses from the first series of regularly-spaced pulses and then inverted; the regularly-spaced pulses and the inverted synchronized command pulses can be combined by being supplied to the two inputs of an AND gate through which the regularly-spaced pulses do not pass if they occur at the same time as an inverted synchronized command pulse.

It is clear that one series of command pulses can be used to advance the phase of the carrier waveform, while another series of command pulses is used to retard the phase, by having a combination of the two arrangements referred to above.

In one form of synchronizing circuit a bi-stable circuit is set by a command pulse and its output is supplied to one of the two inputs of an AND gate whose other input receives regularly-spaced pulses and then a pulse from the series of regularly-spaced pulses will pass through the AND gate provided that a command pulse has previously set the bi-stable circuit. Once the pulse has passed the AND gate, it can be arranged to re-set the bi-stable circuit.

It is possible with such a synchronizing circuit that if the bi-stable circuit is set at just about the time of arrival of a pulse from the source of regularly-spaced pulses there may be some doubt as to whether the bi-stable circuit has been properly set or not, and accordingly a second AND gate may be included in the synchronizing circuit arranged to have one of its inputs supplied from a second bi-stable circuit which is set by an output pulse from the first AND circuit and its second input connected to a series of regularly spaced pulses which occur at intervals after the pulses in the regularly-spaced series applied to the first AND circuit, which intervals are greater than the time for dying away of a disturbance at the output at the first AND gate due to the setting of the first bi-stable circuit just after the occurrence of a regularly spaced pulse at the first AND gate. Normally a conventional bi-stable circuit can settle down after such a disturbance after a fraction of a microsecond so that, provided that the regularly-spaced pulses in the two series are spaced apart by more than several microseconds, there will be no danger of a pulse being passed to the second AND gate in consequence of a disturbance at the first AND gate which is not a clear pulse. The synchronized output pulses from the second AND gate can be used to reset the two bi-stable circuits ready for the next command pulse.

It is clear that if more than two trains of command pulses are to be used for modulating the carrier waveform it will be necessary to have extra series of regularly-spaced pulses of which the pulses are timed to occur between those of the first, or first and second, series of regularly-spaced pulses.

It is possible in some cases to combine a second command signal with the modulated carrier wave carrying a first command signal in the form of the phase of an approximately square wave form. The second command signal can be represented by the mark to space ratio of the wave form if say the comparator for obtaining the error signal from the first command signal uses only the rising or only the trailing edges of the marks in the modulated carrier wave form.

The mark to space ratio could be determined by a direct current component detector.

The invention may be performed in various ways, and one particular embodiment of the invention as applied to the control of a machine tool, will now be described by way of example with reference to the drawing in which.

*General arrangement*

Figure 1A:
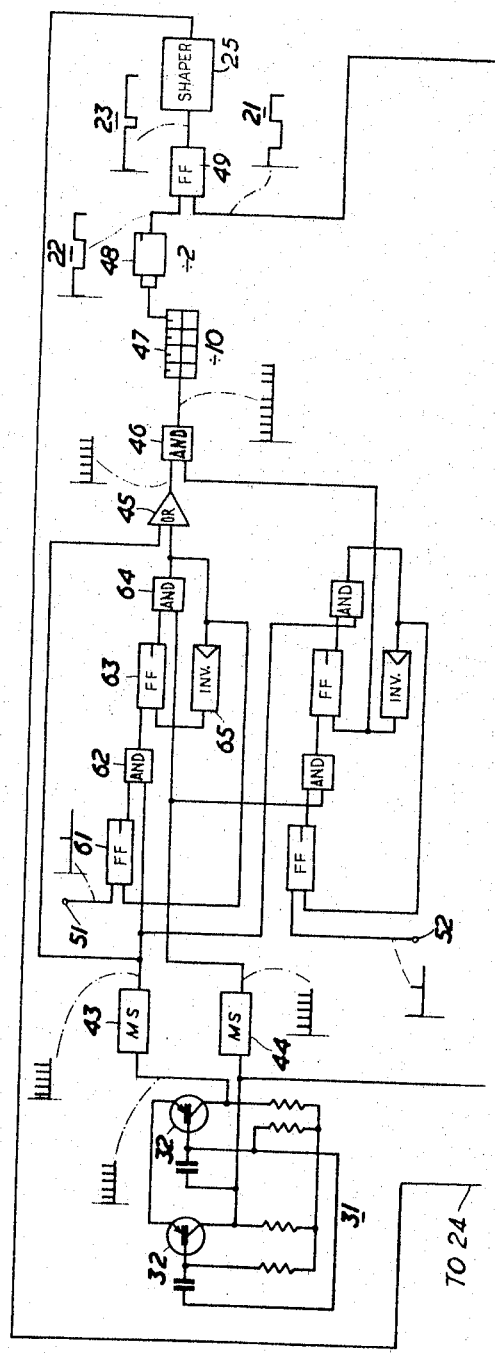
FIGURE 1 is a general layout of the control equipment.

Attached to one part of the machine tool (not shown), for example the bed, is a short diffraction grating 11 mounted in a plane parallel with the direction of movement of the slide of the machine tool and with its lines 12 perpendicular to its direction of movement. Attached to the slide of the machine tool is a long diffraction grating 13 which is mounted in a plane parallel to and slightly spaced from that containing the short diffraction grating 11. As the slide of the machine tool moves, the long diffraction grating moves past the short diffraction grating.

Mounted on one side of the short grating 11 is a lamp 14 which shines through a lens 15 onto the short diffraction grating. On the other side of the long grating are mounted four photo-transistors 16 in line, and light from the lamp 14 passing through the two gratings 11 and 13 passes through four adjustable shutters 17 and a cylindrical type lens 18 onto the photo transistors 16. The shutters 17 are used to adjust the amount of light received by individual photocells to compensate for variations in light sensitivity of the photocells to ensure that they are all of equal effective sensitivity.

The interference pattern 20 is approximately sinusoidal with a phase displacement depending upon the position of the slide. The four photo-transistors 16 are spaced apart by distances corresponding to one quarter wavelength of the pattern.

Figure 2:
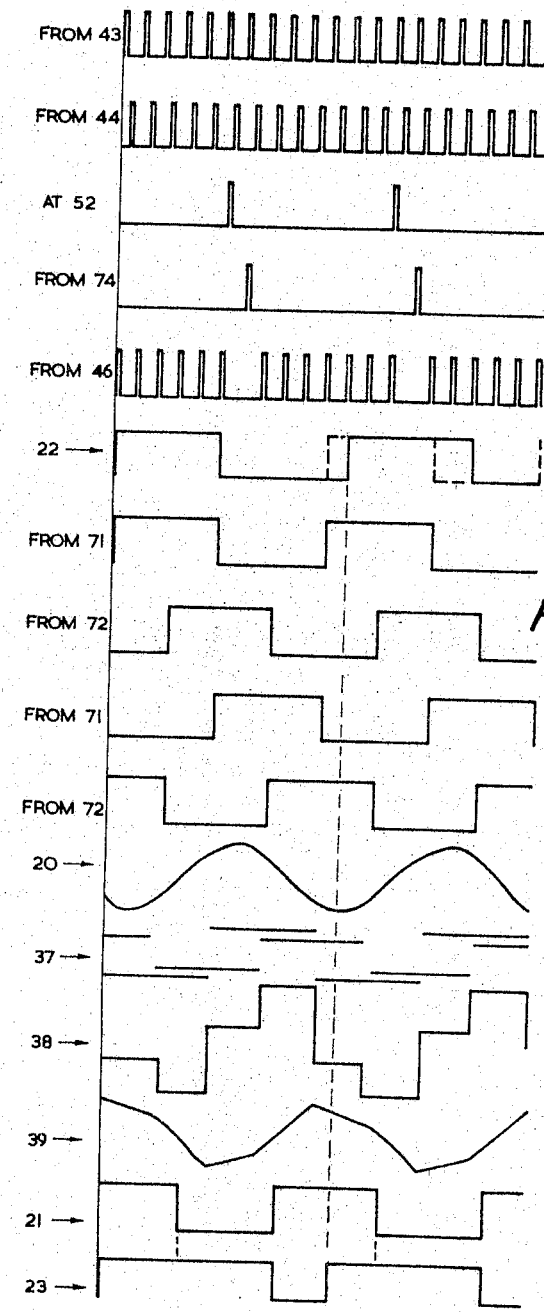
FIGURE 2 is a diagram of the voltage wave form at parts of the layout.

The four photo-transistors 16 are mounted in parallel across a common load 19, and means which will be described below are provided for switching the photo-transistors across the load cyclically and in succession, each photo-transistor being switched in for an equal part of the cycle. In the particular embodiment being described, each photo-transistor is switched in for half of each complete cycle but could be switched in for a quarter or some other fraction of a cycle. By virtue of the photo-transistors, being connected in parallel across a common load, the resulting signal will contain a component at the frequency of the switching signal and whose phase depends upon the relative positions of the two gratings. This component is extracted in a suitable filter and squared as will be described below. Throughout the description of this invention reference is made to waveforms shown in FIG. 2. In each instance these waveforms are designated to correspond to their location in this schematic diagram. The resulting signal 21 constitutes a position signal whose phase is a measure of the actual position of the machine tool slide. By means which will be described below, this position signal is compared with a command signal 22 at the same frequency which is phase modulated to indicate a desired movement of the slide of the machine tool. The comparison of the position signal and the command signal is effected in such a way that an error signal 23 is produced whose D.C. component is dependent upon the phase mismatch and thus on the difference between the actual and the desired positions. This error signal 23 is fed back via shaper 25 to a motor 24 arranged to drive the slide until the error signal is zero.

If due to the fineness of the diffraction gratings 11 and 13 the distance represented by one cycle of the error signal 23 is smaller than is required by the servo system, this distance can be multiplied by a factor by dividing the command signal 22 and the position signal 21 by that factor before phase comparison.

*Source of signals*

Both the command and photocell switching signals are derived from a common 10 kilocycles per second multivibrator 31 employing two transistors 32.

The output from one transistor is used to provide the switching signal and is connected to a decade counter 33 comprising two stages respectively providing output pulses for every five and every two input pulses to produce a 1 kilocycle per second signal, which is fed through a switching circuit 34 which produces four square-wave switching voltages all of the same frequency of 500 cycles per second but advanced in phase by 90° from each other and of constant phase rotation. These signals are fed each to one of four switching transistors 35 which are in turn connected to the four photo-transistors 16 so as to switch each photo-transistor in during the marks of a different one of the square-wave switching voltages to supply to the common load 19 a signal 37 which is composed of four components each component corresponding to the illumination of the photo-transistor concerned.

All the photo-transistors 16 and the switching transistors 35 are operated under similar bias conditions so that the effects of thermal drift tend to cancel. Potentiometers in the base circuits of the photo-transistors are used to balance the dark currents. The signal 38 resulting from the sum of these four signals 37 is fed through an integrator circuit 40 to produce a waveform 39 which is A.C. coupled to a Schmidt trigger circuit 41. This produces the position signal 21, a square-wave with marks corresponding to the positive half of the waveform 39 which is of the same frequency as the switching signals but whose phase is a measure of the relative positions of the two gratings.

Figure 1B:
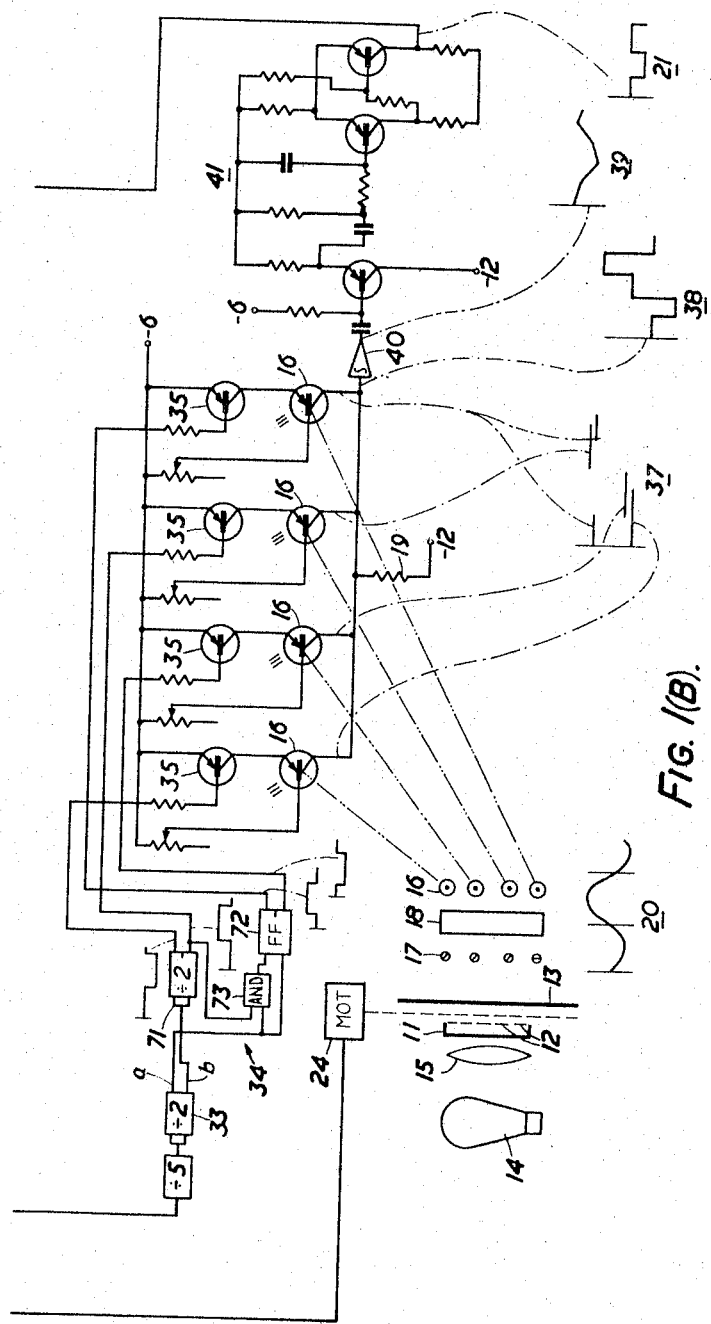

Although the waveforms 38 and 39 have been shown in FIGURE 1 of the drawings the combination of the four outputs from the detector units and the integration and summing can be combined so that nowhere do the waveforms 38 and 39 actually exist.

The command signal is also derived from the multivibrator 31 the two outputs from which are fed through respective mono-stable circuits 43 and 44 which are arranged each to produce a series of output pulses, the pulses from the circuit 44 being intermediate between or shifted in phase by 180° from the pulses from the circuit 43.

These latter pulses from the circuit 43 are fed by way of an OR logic element 45 and a AND logic element 46, the purpose of which will be described below, to a decade counter 47 arranged to divide by ten and flip-flop circuit 48 arranged to divide by two to produce the square command signal 22 consisting of marks corresponding to the duration of ten of the pulses supplied to the decade counter 47 followed by spaces corresponding to the next ten pulses and so on.

The position signal 21 and the command signal 22 are thus square waves of the same frequency with a phase displacement depending upon any difference between the position of the slide of the machine tool and the desired position as determined by the command signal 22.

A flip-flop circuit 49 to whose two inputs the signals 21 and 22 respectively supplied produces an output signal 23 depending upon this phase difference which, as has been described above, is used to correct the position of the slide.

When it is desired to move the slide forwards or backwards it is necessary to advance or retard the phase of the command signal 22 and accordingly a command pulse is supplied at terminal 51 or terminal 52 in accordance with the desired direction of movement.

This pulse is synchronized with the next following pulse from the mono-stable circuit 44 or 43 as the case may be in a manner to be described below.

If the slide is to be moved forwards the command pulse is supplied to the terminal 51 and is synchronized with the next pulse from the mono-stable circuit 44 so that it will appear at the input to the OR logic element 45 mid-way between successive pulses from the mono-stable circuit 43 because the pulses from the circuit 44 are themselves so displaced from the pulses in the circuit 43.

The AND logic element 46 will receive one additional pulse at its input from the OR element 45 in consequence of this forward command pulse.

The result is that the combined counter 47, 48 will advance the phase of the command signal 22 by ½₀th of the cyclic time of the error signal 23 because during a period in which twenty pulses are emitted from the mono-stable circuit 43, twenty-one pulses are fed into the combined counter 47 and 48.

If it is desired to move the slide backwards the command pulse is supplied at 52 and is synchronized with the next following pulse in the train from the mono-stable circuit 43 and is inverted and supplied at the other input to the AND logic element 46. This logic element 46 passes pulses which are supplied at either input provided that two such pulses occur together.

Accordingly in response to a backward command pulse at 52 a pulse will be extracted from the train derived from the output of the mono-stable circuit 43 to be supplied to the decade counter 47.

A backward command pulse at 52 will cause the command signal 22 to be retarded in phase by $\frac{1}{20}$th of the cyclic time of the error signal 23 due to the counter having to count one further pulse because of the pulse which has been omitted.

The servo feed-back system will then act in the usual way to drive the slide into the position in which the position signal 21 corresponds in phase with the new command signal 22.

Continuous movement of the slide can be effected by supplying a series of forward or backward command pulses to the terminals 51 or 52 and it is only necessary to ensure that these pulses do not have a pulse repetition rate faster than the pulse repetition rate from the mono-stable circuit 43.

Synchronization circuit

There are two synchronization circuits. Each is for synchronizing a command pulse with the next pulse appearing at the output of one of the mono-stable circuits 43 and 44 and since the two circuits are identical one only will be described here.

The positive command pulse supplied at the terminal 51 is connected to one input of a flip-flop circuit 61 to set this flip-flop 61 to have unit output. This unit output is applied to one input of an AND logic element 62 whose other input is supplied with the pulses from the mono-stable circuit 43 and it is clear that when the next pulse from the circuit 43 arrives an output pulse will be delivered from one input element 62 because both inputs are energized.

The output is connected to set a second flip-flop 63 to give unit output for connection to a second AND logic element 64 which is also supplied with the pulses from the mono-stable circuit 44.

Thus when the next pulse from the mono-stable circuit 44 arrives it will produce an output from the AND logic element 64 to be supplied to the second input of the OR logic element 45. Of course if there had been no command pulse at the terminal 51 no pulse from either circuit 43 or 44 would produce an output from its AND element 62 or 64 and it is only when a command signal is supplied that an additional pulse is fed into the main train of pulses from the circuit 43 at the OR element 45 in synchronism with pulse from the circuit 44.

A pulse appearing at the output of the AND logic element 64 is fed back to the two flip-flops 61 and 63, the path of the flip-flop 63, being by way of an inverter 65, to reset these flip-flops to zero output in preparation for the next command pulse.

If the command pulse applied at 51 occurs at about the same time as the end of a pulse in the train generated in the mono-stable circuit 43 the AND logic element 62 may not clearly produce an output pulse. If the pulse does not arrive in time to produce a clear output from the logic element 62 to set the flip-flop 63 to give unit output, the flip-flop may be disturbed but not properly set. The disturbance will die away or a unit output will however be set after a time which is arranged to be less than the time interval between the end of the pulse in the train from the mono-stable circuit 43 and the coming of the next pulse in the train which is applied from the circuit 44 to the second input of the AND logic element 64. By the time the next pulse appears at the AND logic element 64 from the mono-stable circuit 44 the other input to the element 64 will be clearly either unit or zero and if it is zero no pulse will be passed.

However the next pulse from the mono-stable circuit to the logic element 62 will combine with the unit output which is still subsisting at the flip-flop 61 to produce an unmistakable pulse input to the flip-flop 63.

In this way there will be no ambiguity but any random command pulse will be synchronized with one or other of the pulses in the train from the mono-stable circuit.

The switching circuit 34

This circuit 34 for producing a switching signal in phase relation to the command signal 22 will now be described. It comprises two flip-flops 71 and 72 and an AND gate 73.

Signals appearing at one output (output $b$) of the decade counter 33 which consists of a $\div 5$ followed by a $\div 2$ stage are fed directly to both inputs of the $\div 2$ flip-flop circuit 71 so that each pulse input causes the output from the flip-flop 71 to change over. Each output from the flip-flop 71 comprises one of the switching voltages for the transistors 35 and it will be appreciated that these switching voltages are 180° out of phase and have the same frequency as the pulses at the output of the flip-flop 48 because the flip-flop 71 acts to divide by two to compensate for the division effected in the flip-flop 48.

One of the outputs from the flip-flop 71 (called for convenience the first output) is connected as an input to the AND gate 73 whose other input receives pulses from the other output (output $a$ which is 180° out of phase with output $b$) of the decade counter 33. The pulses from the output $a$ of the counter 33 and the output from the AND gate 73 are supplied as respective inputs to the flip-flop 72.

Pulses are produced at the output of the AND gate 73 only when pulses appear on both inputs to this gate simultaneously. The "second" output of the flip-flop 72 is set to a 1 when the input from the AND gate 73 goes positive. This occurs when the $a$ output from the counter 33 goes positive after the first output from the flip-flop 71 has gone positive. In this way the "second" output from the flip-flop 72 must always follow the first output from the flip-flop 71 and so the phase rotation is always the same.

Because the two outputs from the counter 33 are 180° out of phase the transitions of the outputs of flip-flop 72 are 90° out of phase with respect to the transition in the outputs of the flip-flop 71.

Further information carried by command signal

It will have been observed that the flip-flop 49 only uses the rising edges of the command signal 22 to produce the error signal 23, and accordingly it is possible to carry further information on the command signal 22 by adjusting the mark/space ratio without adjusting the positions of the rising edges. For example, in a machine tool application a different spindle speed or a tool changing operation can be indicated by the length of the marks in the command signal without affecting the proper production of the error signal 23.

In one way of modifying the command signal 22 the digital converter comprising the elements 43, 44, 51, 52, 61, 62, 63, 64, 65, 45, 46, 47 and 48 can be duplicated to produce a second similar command signal $22^1$. In addition to the command pulses fed in at 51 and 52 on the first digital converter the additional converter has further pulses supplied at its input $51^1$ and $52^1$ which are such as to shift the phase of the signal $22^1$ so that the trailing edges occur at the desired places in the final command signal. The signals 22 and $22^1$ are connected as respective inputs to a flip-flop circuit which produces a square wave signal, the rising edge of which is determined by the rising edge of the output of the first command signal 22 and the falling edge of which is determined by the rising edge of the additional command signal $22^1$.

Figure 3:
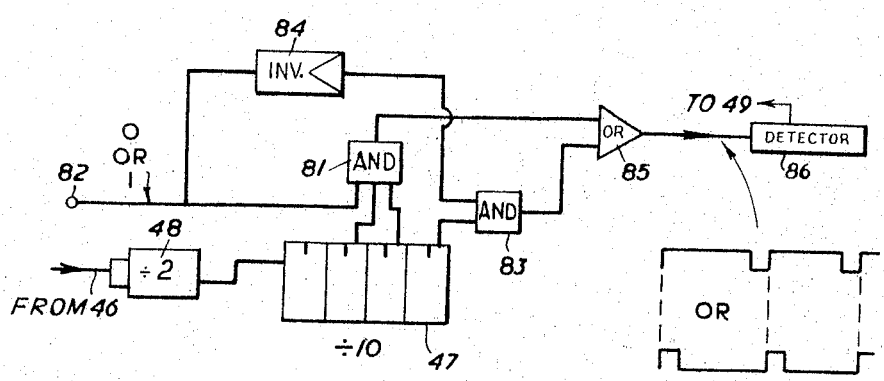
FIGURE 3 is a circuit diagram of an alternative part of the apparatus.

In an alternative way of providing the modified command signal as described with reference to FIGURE 3 the positions of the counter 47 and the flip-flop 48 are reversed and an additional control circuit is provided for controlling the output from the counter 47 to the flip-flop 49.

The counter 47 consists of four flip-flops arranged as a four-stage binary counter with feedback from the last stage (the most significant figure stage), to the second and third stages to ensure that in counting from the output of the flip-flop 48 six of the possible sixteen settings are missed out and ten only are counted.

The outputs from the second and third stages of counter 47 are connected as two inputs to an AND circuit 81, the third input of which is connected to a source 82 of control signals and the output of this AND gate 81 is connected to one input of an OR gate 85, the output of which is connected to the flip-flop 49. The output from the fourth stage of the counter 47 is connected as one input to an AND gate 83, the other input to which is obtained from the control signal source 82 by way of an inverter 84. This means that only one of the AND gates 81 and 83 can be open at any one time, the gate 81, if there is a unit signal at 82, and the gate 83 if there is a zero signal at 82.

If the AND gate 83 is open the output from the last stage of the counter 47 is passed through it and through the OR gate 85 to the flip-flop 49, and in the counter 47 this output from the last stage consists of eight units followed by two zeros. This means that the command wave form 22 has a mark to space ratio of 8:2. On the other hand when the AND gate 81 is open when there is unit signal at the control terminal 82, the combined outputs of the second and third stages of the counter are used, but a unit output is only delivered for the gate 81 if the second and third stage outputs are both units, and in the counter 47 they are both units only during the first two of the ten counting stages. This means that the signal passing the OR gate 82 has a mark to space ratio of 2:8.

The difference between these two control signals with their different mark to space ratios can be easily recognized by extracting the direct current component at 86, the output from which can be used for example to determine which of two possible spindle speeds should be used or which of two tools should be used.

*Presetting arrangement*

It may be necessary to provide means for setting the equipment to an initial condition before commencement of an operation and this could readily be done by presetting to zero the units 47 and 48 in the digital converter (or in both digital converters if there is an additional converter, according to the modification described above).

What I claim as my invention and desire to secure by Letters Patent is:

1. A control system including an arrangement for modulating a waveform of regularly-spaced pulses in accordance with information, in the form of command pulses for directing movement of a movable load derived from an external signal generating means comprising, in combination, oscillating pulse generating means to generate two sets of pulses respectively timed with the phase from opposite half cycles of oscillation to occur with pulses in the two sets spaced between each other, the first set of pulses comprising said regularly-spaced pulses, a counter for counting said regularly-spaced pulses, said counter having a normal cyclic period equal to the time to count a predetermined number of said regularly-spaced pulses, selecting means deriving single pulses selectively from either said first set of pulses or the second set of pulses occurring therebetween, a mixer connected to said signal generating means and operative to combine said single pulses from said second set derived in said selecting means to merge with said command pulses with the regularly-spaced pulses to add a pulse between two of the regularly-spaced pulses whereby the output of the counter is advanced by the duration of one count, said mixer also having means operable from said selecting means to subtract one of the pulses from said regularly spaced pulses responsive to the single pulse derived from the first set of pulses whereby the output of the counter is delayed by the duration of one count, detector means for sensing errors in the position of said movable load, means operable synchronously from said pulse generating means deriving in said detector means a position signal, means responsive to said position signal for deriving a control signal from said counter output, and a driving motor connected to receive the control signal and control the movement of said load in accordance with said control signal.

2. An arrangement as claimed in claim 1 including a synchronizing circuit coupled to delay command pulses to be in predetermined time relationship with the regularly-spaced pulses before being supplied to the mixer.

3. An arrangement as claimed in claim 2 in which the synchronizing circuit includes delay means for delaying the command pulses to occur at time between regularly-spaced pulses, to thereby add pulses to the regularly-spaced pulses.

4. An arrangement as claimed in claim 2 in which the synchronizing circuit includes means to delay the command pulses to occur in synchronism with pulses from the first series of the regularly-spaced pulses, to thereby cancel corresponding regularly spaced pulses.

5. An arrangement as claimed in claim 4 including a second synchronizing circuit including means to delay the command pulses to occur at times between regularly-spaced pulses, to thereby add pulses to the regularly-spaced pulses.

6. Apparatus as defined in claim 2 wherein the synchronizing circuit comprises a bi-stable circuit having at least one input circuit and two output circuits, means setting the bistable circuit at the input circuit with a command pulse, an AND gate with two inputs one of which is connected to one output of the bistable circuit, and means supplying the regularly-spaced pulses to the other input of the AND gate.

7. An arrangement as claimed in claim 6 in which the AND gate output circuit, is connected to reset the bistable circuit at a further input lead.

8. An arrangement as claimed in claim 6 in which the synchronizing circuit includes a second AND gate having two inputs and a second bi-stable circuit, a circuit setting the second bistable circuit by an output pulse from the first AND gate, means connecting one input of the second AND gate to the output circuit of the second bistable circuit to the second AND gate means supplying a second series of regularly-spaced pulses which occur at intervals interleaved with the pulses in said regularly-spaced series applied to the second AND circuit.

9. An arrangement as claimed in claim 8 in which the synchronized output pulses from the second AND gate are used to reset both the bi-stable circuits.

References Cited by the Examiner

UNITED STATES PATENTS

| | | | |
|---|---|---|---|
| 2,680,241 | 6/1954 | Gridley | 340—206 |
| 2,715,678 | 8/1955 | Barney | 340—347 X |
| 2,885,662 | 5/1959 | Hansen | 332—9 X |
| 2,934,604 | 7/1958 | Bizet. | |
| 2,948,890 | 8/1960 | Barth et al. | |
| 2,950,471 | 8/1960 | Hoeppner | 340—347 |
| 3,258,667 | 6/1966 | McDonough et al. | 318—284 |

FOREIGN PATENTS 646,050  11/1950  Great Britain.

ORIS L. RADER, *Primary Examiner.*

L. MILLER ANDRUS, NEIL C. READ, MILTON O. HIRSHFIELD, *Examiners.*

A. L. BRODY, L. A. HOFFMAN, H. L. PITTS, T. LYNCH, *Assistant Examiners.*